United States Patent
Klaftenegger et al.

(10) Patent No.: US 11,767,113 B2
(45) Date of Patent: Sep. 26, 2023

(54) INFLATABLE UNIT LOAD DEVICE

(71) Applicant: S.W.O.R.D. International Inc., Sparks, NV (US)

(72) Inventors: Christopher Collin Klaftenegger, Reno, NV (US); Jeremy Allen Elrod, Reno, NV (US)

(73) Assignee: S.W.O.R.D. INTERNATIONAL INC., Sparks, NV (US)

( * ) Notice: Subject to any disclaimer, the term of this patent is extended or adjusted under 35 U.S.C. 154(b) by 0 days.

(21) Appl. No.: 17/322,652

(22) Filed: May 17, 2021

(65) Prior Publication Data
US 2021/0354824 A1 Nov. 18, 2021

Related U.S. Application Data

(60) Provisional application No. 63/026,119, filed on May 17, 2020.

(51) Int. Cl.
*B64D 1/14* (2006.01)

(52) U.S. Cl.
CPC ..................... *B64D 1/14* (2013.01)

(58) Field of Classification Search
CPC .................... B64D 1/08; B64D 1/14
See application file for complete search history.

(56) References Cited

U.S. PATENT DOCUMENTS

| | | | | |
|---|---|---|---|---|
| 2,363,249 A * | 11/1944 | Hutchinson | | B64D 1/14 206/83.5 |
| 6,805,066 B2 * | 10/2004 | Johnson | | B63B 35/38 441/35 |
| 9,278,731 B1 * | 3/2016 | Canela | | B63B 17/00 |
| 9,302,749 B1 * | 4/2016 | D'Offay | | B63B 7/082 |
| 10,392,084 B2 * | 8/2019 | Wood | | B63B 32/51 |
| 10,427,788 B1 * | 10/2019 | Grenga | | B64D 1/14 |
| D900,702 S * | 11/2020 | Builder | | D12/316 |
| 2011/0240800 A1 * | 10/2011 | Fox, Jr. | | B64D 1/14 244/137.1 |
| 2012/0025027 A1 | 2/2012 | Yandle et al. | | |
| 2015/0069185 A1 * | 3/2015 | Parkinson | | B64D 1/14 244/137.3 |
| 2019/0263475 A1 * | 8/2019 | Cooper | | B63B 32/40 |

FOREIGN PATENT DOCUMENTS

| | | | | |
|---|---|---|---|---|
| CN | 106882379 A | * | 6/2017 | |
| CN | 108327907 A | * | 7/2018 | ............... B64D 1/14 |
| CN | 111017215 A | | 4/2020 | |
| WO | WO-9602219 A1 | * | 2/1996 | ........... A61G 7/1028 |
| WO | 2004/041642 A1 | | 5/2004 | |

OTHER PUBLICATIONS

International Search Report and Written Opinion received for PCT Patent Application No. PCT/CA2013/000581, dated Sep. 10, 2013, 9 pages.

* cited by examiner

*Primary Examiner* — Richard G Davis
(74) *Attorney, Agent, or Firm* — VLP Law Group

(57) ABSTRACT

An inflatable unit load device that is used to deploy cargo from an aircraft is described herein. In some instances, the inflatable unit load device may include a bladder having one or more inflatable interior bladder cells and a top surface, the top surface of the bladder forming a rigid support surface when the bladder is inflated on which cargo can be loaded, an outer material that positions the one or more inflatable interior bladder cells of the bladder, and a cargo retaining system that retains the cargo on the top surface.

20 Claims, 7 Drawing Sheets

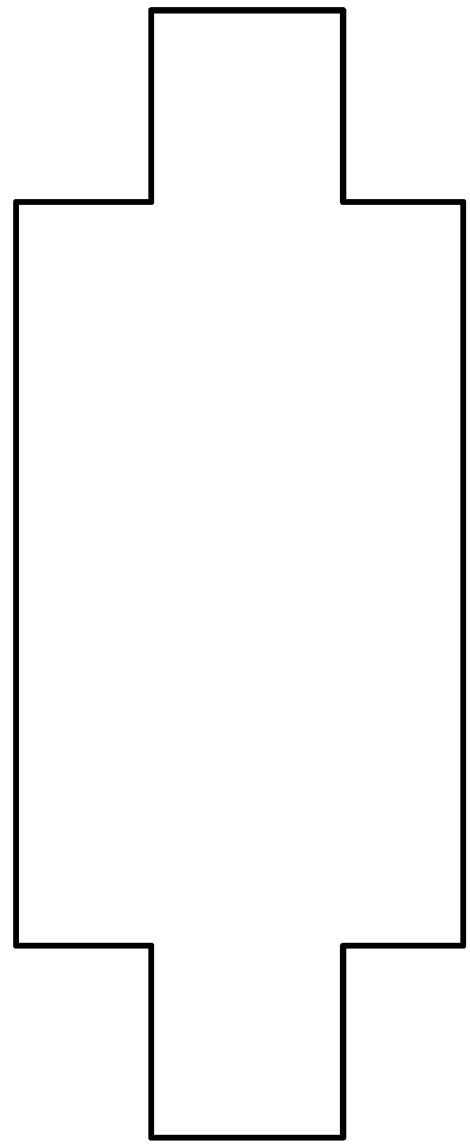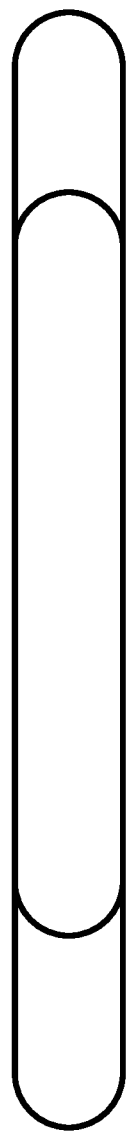

INFLATABLE UNIT LOAD DEVICE

CROSS-REFERENCE TO RELATED APPLICATIONS

The present application claims the benefit under 35 U.S.C. 119(e) of U.S. Provisional Patent Application Ser. No 63/026,119, titled "Unit Load Device", filed on May 17, 2020, the entire contents of which are incorporated herein by reference.

BACKGROUND

The present disclosure relates to technology for, among other things, an inflatable unit load device.

Current implementations of unit load devices are pallets or containers that are used to load luggage, freight, and mail on aircraft. Current unit load devices allow large quantities of cargo to be bundled into a single unit which makes it easier to plan for, load, and unload the cargo from the aircraft. In military implementations, unit load devices may be used to deploy various cargo, including vehicles and other heavy loads, out of the aircraft. In some implementations, unit load devices are parachute deployable and the cargo may be deployed out of the aircraft as it flies.

Current implementations of unit load devices are rigid and of a fixed shape and dimension, such as a metal pallet or metal box. These rigid unit load devices consume both critical space and weight on the aircraft both in the loaded and unloaded states. These rigid unit load devices also consume additional space in storage when they are not being used or after being deployed.

Current implementations of parachute deployable rigid unit load devices, such as a rigid unit load device that is deployed from an airborne aircraft and slowed on decent to the earth using a parachute, are subject to impact damage on landing. This impact damage to the rigid unit load device can render the rigid unit load device useless for future deployments, thereby increasing waste, cost, and environmental impact, and can also result in damage to the goods that are loaded on the rigid unit load device. Additionally, in some military operations, once the rigid unit load device is deployed via parachute, the rigid unit load device is cumbersome to carry around or hide (such as by burying) after it is unloaded.

SUMMARY

According to one innovative aspect of the subject matter described in this disclosure, one general aspect of an inflatable unit load device may include: a bladder having one or more inflatable interior bladder cells and a top surface, the top surface of the bladder forming a rigid support surface when the bladder is inflated on which cargo can be loaded; an outer material that positions the one or more inflatable interior bladder cells, and a cargo retaining system that retains the cargo on the top surface.

Implementations may include one or more of the following features. The inflatable unit load device where the one or more inflatable interior bladder cells are patchable when a leak occurs. The cargo retaining system is configured to attach to a parachute and be deployed from an aircraft. The bladder has a bottom surface opposing the top surface and where the one or more inflatable interior bladder cells are disposed between the top surface and the bottom surface, such that the bladder protects the cargo from an impact force to the bottom surface during deployment from an aircraft. The one or more inflatable interior bladder cells include one or more pressure relief valves. The one or more pressure relief valves are configured to release an internal pressure within the one or more pressure relief valves when the internal pressure exceeds a threshold value. The one or more inflatable interior bladder cells include a mechanical flange for one or more of inflation of the one or more inflatable interior bladder cells and deflation of the one or more inflatable interior bladder cells. The one or more inflatable interior bladder cells and the outer material are configured to be rolled up for storage when deflated. The cargo is a vehicle positioned on the top surface when the bladder is inflated and securely retained in place by the cargo retaining system. The cargo retaining system includes a webbing system having s a center strap that wraps circumferentially around the outer material, the center strap including one or more loops through which parachuting webbing straps may be passed, the one or more loops retaining the parachute webbing in place when the one or more inflatable interior bladder cells are inflated.

One general aspect includes a method of deploying an inflatable unit load. The method also includes positioning a cargo retaining system around a deflated outer material of an inflatable unit load device that includes a bladder with one or more inflatable interior bladder cells; inflating the one or more interior bladder cells of the bladder of the inflatable unit load device until a top surface of the inflatable unit load device is sufficiently stable to support a cargo, loading a cargo onto the top surface, and securing the cargo using attachment mechanisms of the cargo retaining system.

Implementations may include one or more of the following features. The method of deploying the inflatable unit load device where the cargo retaining system includes parachute attachment mechanisms and the method further may include attaching a parachute system to the parachute attachment mechanisms; and deploying the cargo with the inflatable unit load device out of an aircraft via the parachute system. The bladder has a bottom surface opposing the top surface and the one or more interior bladder cells are disposed between the top surface and the bottom surface such that an impact force applied to the bottom surface is dissipated by the one or more inflatable interior bladder cells to protect the cargo from the impact force. After landing, the method further may include unloading the cargo from the top surface; deflating the one or more interior bladder cells of the bladder; and rolling up the deflated outer material and the one or more interior bladder cells of the bladder for storage. Cargo is further protected from the impact force by an impact pillow that is positioned between the cargo and the top surface.

One general aspect includes an. The inflatable unit load device system also includes a bladder having one or more inflatable interior bladder cells disposed between a top surface and a bottom surface, the top surface of the bladder forming a rigid support surface on which cargo can be loaded when the bladder is inflated; a cargo retaining system that retains the cargo on the top surface; and an impact pillow with a separate inflatable bladder system, the impact pillow being positioned between the top surface and at least a portion of the cargo to provide additional protection to the cargo.

Implementations may include one or more of the following features. The inflatable unit load device system where the impact pillow is specifically shaped to provide protection to at least a portion of the cargo when an impact force is applied to the bottom surface. The impact pillow includes one or more impact pillow pressure relief valves that are configured to release pressure at a first threshold pressure value and where the one or more inflatable interior bladder cells include one or more pressure relief valves that are configured to release pressure at a second threshold pressure value. The first threshold pressure value and the second threshold pressure value providing cascading pressure relief to protect at least a portion of the cargo from an impact force applied to the bottom surface during landing. The cargo retaining system is further configured to attach to a parachute system and the cargo is deployable from an aircraft via the parachute system.

The features and advantages described herein are not all-inclusive and many additional features and advantages will be apparent to one or ordinary skill in the art in view of the figures and description. Moreover, it should be noted that the language used in the specification has been selected for readability and instructional purposes and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

FIG. 3A is a top view of an example impact pillow.

FIG. 3B is a front-side view of an example impact pillow.

DETAILED DESCRIPTION

Figure 1:
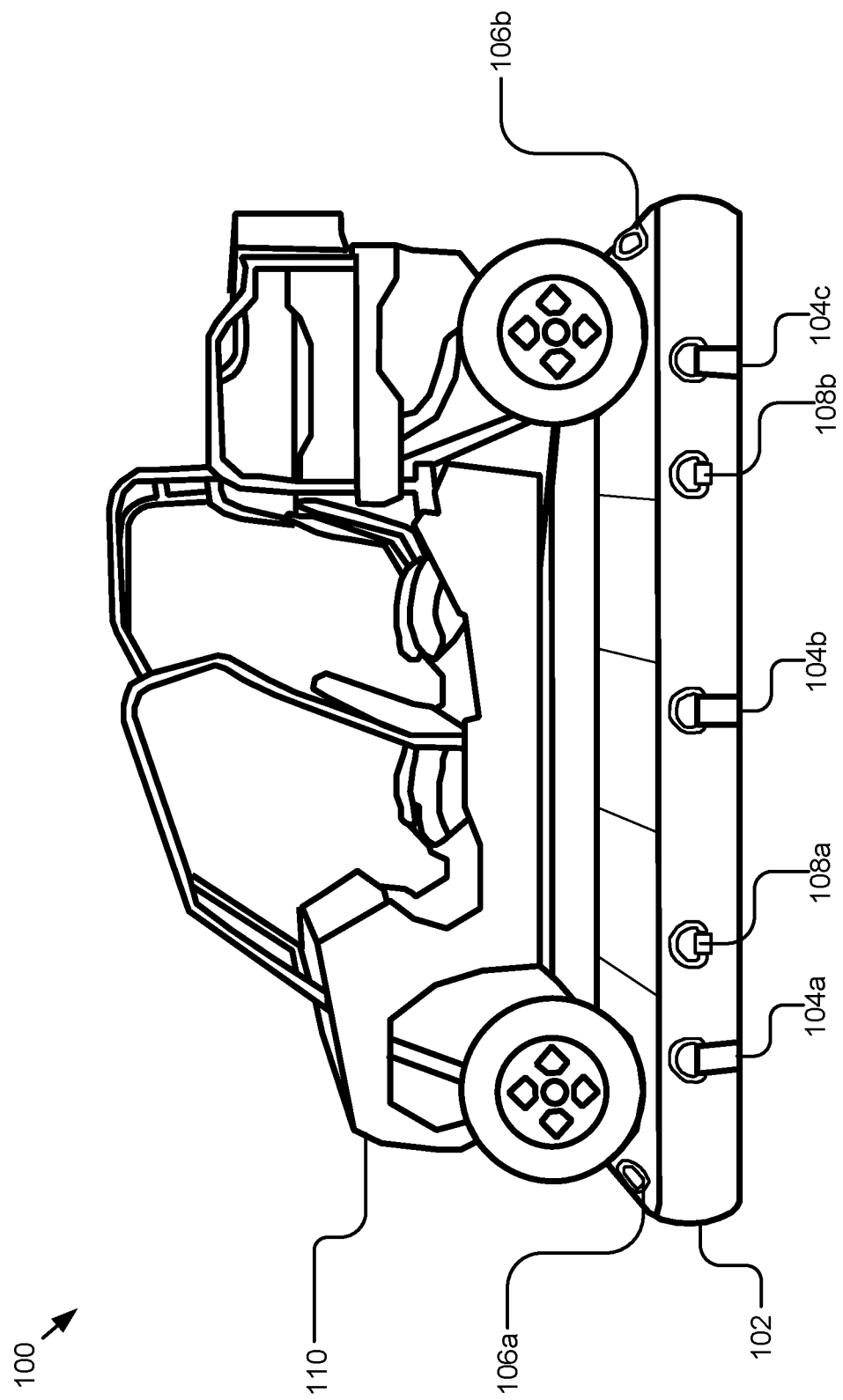
FIG. 1 is an example inflatable unit load device with an example cargo.

The technology disclosed in this application describes an inflatable unit load device 102 and methods of deploying the inflatable unit load device 102. FIG. 1 shows an example inflatable unit load device 102 with an example cargo 110. As shown in FIG. 1, in some implementations, the inflatable unit load device 102 may have a substantially flat top surface and cargo 110 or other material may be loaded on the top surface of the unit load device 102.

In the example shown in FIG. 1, the cargo 110 is a vehicle that is positioned on the top surface of the inflatable unit load device 102. The cargo 110 may be secured to the inflatable unit load device 102 using a cargo retaining system that in some implementations may include the side tie-down rings 108a and/or 108b and/or the corner tie-down rings 106a and/or 106b. In some implementations, the tie-down rings 106 and 108 may use D-rings or other attachment mechanisms to secure webbing straps that are passed around the cargo 110. In some implementations, the cargo retaining system may further include webbing straps and/or D-rings rated up to 10,000 pounds, although other implementations with other weight ratings are also contemplated.

As shown in FIG. 1, the inflatable unit load device 102 may also include parachute rigging attachments 104, such as parachute rigging attachments 104a, 104b, and 104c in the example shown in FIG. 1. The parachute rigging attachments 104 may be part of the cargo retaining system and may include webbing straps or other attachment mechanisms that pass around, or through the inflatable unit load device 102 in some implementations, and attach to the parachute system when the inflatable unit load device 102 and cargo 110 are being deployed via parachute from an aircraft.

The inflatable unit load device 102 may include a bladder 240 that can be inflated and/or deflated and is multi-configurable for different formats of use. When the bladder 240 of the inflatable unit load device 102 is inflated, the inflatable unit load device 102 forms a semi-rigid, substantially flat top surface that is suitable for loading various cargo 110, like a rigid metal unit load device. However, the inflatable unit load device 102 can perform the same function as the rigid unit load device while also being much lighter in weight as compared to a rigid unit load device. For example, in some implementations, the inflatable unit load device 102 may weigh 200 pounds, while the comparable rigid metal pallets weigh 800 pounds. This decrease in weight allows additional air cargo space to be used and/or reduces overall weight/fuel consumption of an aircraft during flight as compared to a rigid unit load device. This reduced weight of the inflatable unit load device 102 means more weight can be allocated to the transport aircraft for cargo 110 or less fuel burned for equal volume of freight.

In some implementations, the bladder 240 of the inflatable unit load device 102 may have the top surface and a bottom surface opposing the top surface. The bladder 240 may include one or more inflatable bladder cells 240a-240n that are disposed between the top surface and the bottom surface. The inflatable unit load device 102 provides increased protection from impact forces applied to the bottom surface. This protection from the impact force protects both the inflatable unit load device 102 and the cargo 110 on impact, such as a landing impact via a parachute deployment. The inflatable unit load device 102 can compress on impact as compared to a rigid unit load device. In some implementations, on impact the inflatable unit load device 102 is able to release pressure through one or more valves of the inflatable unit load device 102, in order to spread the impact force out over a period of time and reduce the potential for damage to the inflatable unit load device 102 and/or the cargo 110.

In some implementations, when the bladder 240 of the inflatable unit load device 102 is deflated, the unit load device 102 can be packed away, such as by rolling or folding it up. In one example, a rolled-up inflatable unit load device 102 may measure around 18 inches wide by 75 inches long, although other dimensions are also contemplated based on the side of the inflatable unit load device 102. By packing the deflated inflatable unit load device 102 away, it can save space both on an aircraft and in storage. In some implementations, after being deployed via a parachute, the deflated inflatable unit load device 102 can be rolled up and easily transported, such as on the back or side of a vehicle that was being transported as cargo 110 on the inflatable unit load device 102. This is beneficial as compared to the rigid unit load devices since the deflated inflatable unit load device 102 can be easily rolled up and transported or buried/hidden after use.

In some implementations, the inflatable unit load device 102 is readily patchable if a leak occurs in one or more of the inflatable interior bladder cells 240a-240n of the bladder 240 of the inflatable unit load device 102 occurs, such as during a parachute deployment, etc. Being easily patchable as compared to the rigid unit load devices, is beneficial because it allows the inflatable unit load device 102 to be reused and/or fixed in the field as needed rather than purchasing new rigid unit load devices. In some implementations, the inflatable unit load device 102 may be patched using various patching methods to seal any punctures or holes and restore the inflatable unit load device 102 to the exact dimension and shape in a matter of minutes.

Figure 2A:
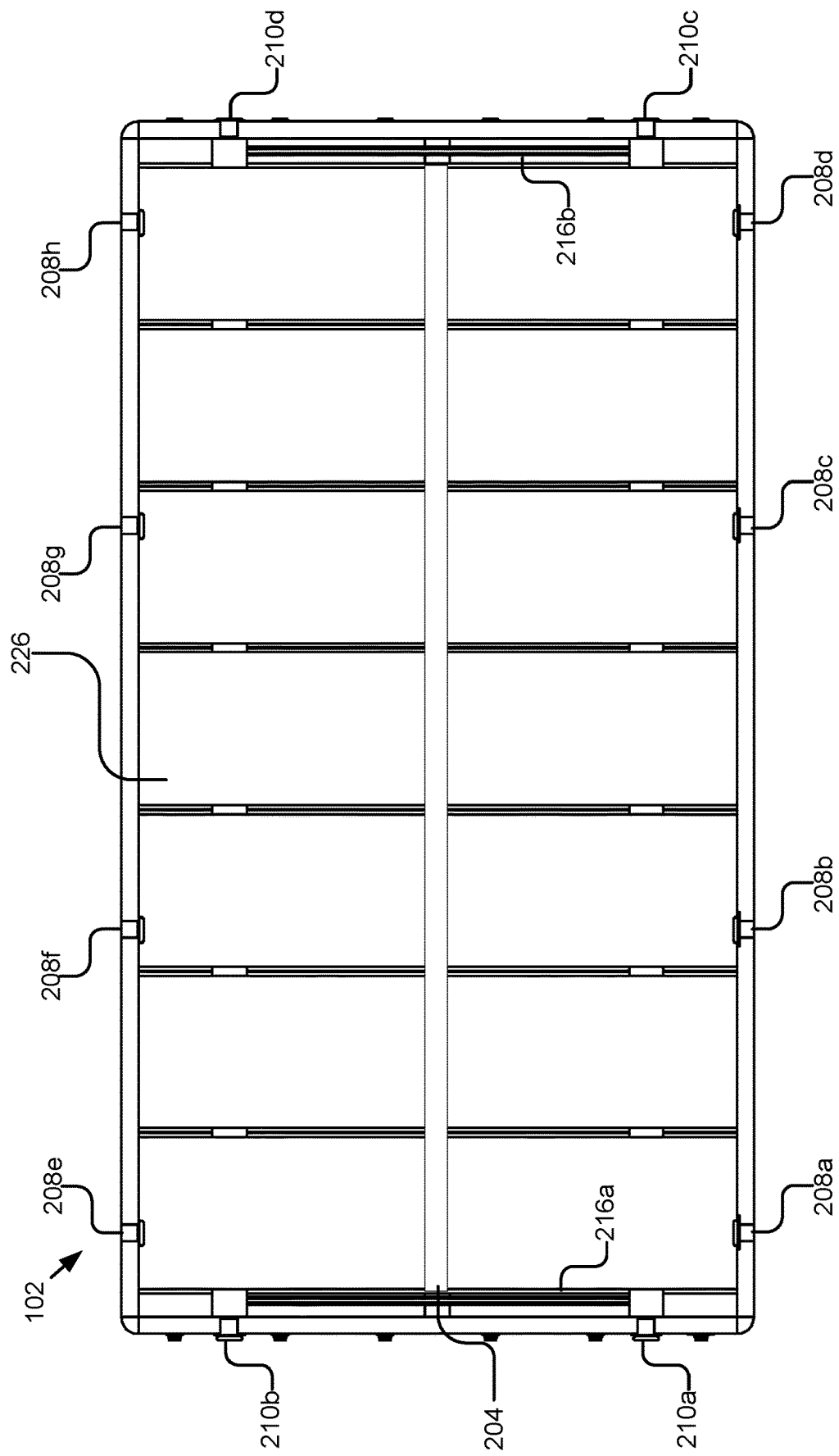
FIG. 2A is a top view of an example inflatable unit load device.

FIGS. 2A, 2B, 2C, and 2D depict various views of the inflatable unit load device 102. FIG. 2A shows a top view of the inflatable unit load device 102. In some implementations, as shown in FIG. 2A, the inflatable unit load device 102 may form a rectangular shape with a substantially flat top surface when the bladder 240 is inflated. As shown in FIG. 2A, various attachment mechanisms of the cargo retaining system may be situated on the inflatable unit load device 102. For example, cargo retaining system may include the side webbing attachments 208, such as 208a, 208b, 208c, 208d, 208e, 208f, 208g and 208h, that may be attached to the side panels of the inflatable unit load device 102. In further implementations, the cargo retaining system may include webbing attachments 208 may be straps that pass around and under the inflatable unit load device 102 and allow cargo 110 (not shown) or parachute systems to attach to the inflatable unit load device 102. The cargo retaining system may further include side webbing attachments 208 that may have D-rings or other attachment mechanisms that can use webbing or other strapping systems to secure cargo 110 to the top surface of the inflatable unit load device 102. It should be understood that while a specific number of side webbing attachments 208 of the cargo retaining mechanism are shown in FIG. 2A, various quantities of side webbing attachments 208 are contemplated based on the cargo configurations and/or size of the inflatable unit load device 102.

In further implementations, the cargo retaining mechanism may include front webbing attachments 210, such as 201a, 210b, 210c, and 210d, that may be attached to the side panels of the inflatable unit load device 102 along the front and rear of the inflatable unit load device 102. The front webbing attachments 210 may be attached to the side panels of the inflatable unit load device 102. In further implementations, the cargo retaining mechanism may include front webbing attachments 210 that may be straps that pass around and under the inflatable unit load device 102 and allow cargo 110 (not shown) or parachute systems to attach to the inflatable unit load device 102. The cargo retaining system may include side webbing attachments 210 may have D-rings or other attachment mechanisms that can use webbing or other strapping systems to secure cargo 110 to the top surface of the inflatable unit load device 102. In further implementations, cargo retaining system may include front webbing attachments 210 that may be straps that pass around and under the inflatable unit load device 102 and allow cargo 110 (not shown) or parachute systems to attach to the inflatable unit load device 102. The cargo retaining system may include front webbing attachments 210 that may have D-rings or other attachment mechanisms that can use webbing or other strapping systems to secure cargo 110 to the top surface of the inflatable unit load device 102. It should be understood that while a specific number of front webbing attachments 210 are shown in FIG. 2A, various quantities of front webbing attachments 210 are contemplated based on the cargo configurations and/or size of the inflatable unit load device 102.

In some implementations, an access point 216 may be included in the inflatable unit load device 102. The access point 216 is depicted as zippers 216a and 216b on FIG. 2A and the zippers 216a and 216b are located on the top surface and/or a bottom surface of the inflatable unit load device 102. The access point 216 may be a zipper, Velcro, overlapping seam, button, ties, or other mechanism that allows the outer material of the inflatable unit load device 102 to be opened and provides access to the bladder 240 situated inside of the outer material of the inflatable unit load device 102. The outer material of the inflatable unit load device 102 may act as a protective cover and keep the bladder 240 positioned correctly.

Figure 2B:
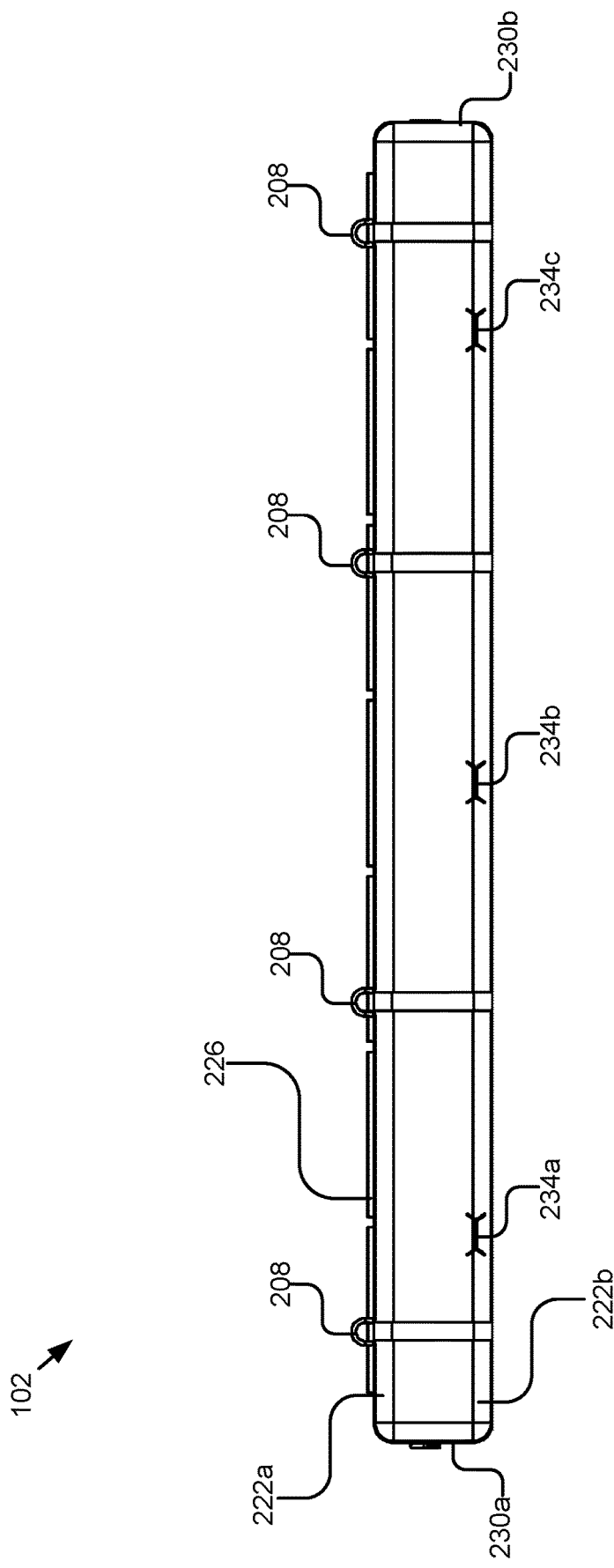
FIG. 2B is a front-side view of an example inflatable unit load device.

In some implementations, one or more friction pads 226 may be positioned on various surfaces of the inflatable unit load device 102 for additional protection, such as on the top surface as shown in FIG. 2A and 2B. The friction pad 226 may be a sheet of protective material or sections of protective material that may be attached to the inflatable unit load device 102. In some implementations, the friction pad 226 may be positioned within a plate sleeve formed into the outer material of the inflatable unit load device 102.

In some implementations, the cargo retaining system may include a center strap 204 that may pass circumferentially around the inflatable unit load device 102 from the left side to the right side. The center strap 204 may be positioned substantially within the center of the inflatable unit load device 102. In further implementations, multiple center straps 204 may be used that may be positioned circumferentially around the inflatable unit load device 102. The center strap 204 may include strap loops within portions of the center strap 204 that allows parachute rigging straps or other straps of the cargo retaining system (such as straps 104 or 208) to pass throw in order to keep the parachute rigging straps from sliding around on the inflatable unit load device 102. The center strap 204 may act as a harness system to position the parachute rigging straps in the correct locations for attaching a parachute system. In some implementations, the cargo retaining system, such as the center strap 204 and/or other straps (such as straps 104, 208, or 210) may be positioned before the inflatable unit load device 102 is inflated. After the inflatable unit load device 102 is inflated, the inflatable unit load device 102 expands into the positioning of the center strap 204 and/or other straps (such as straps 104, 208, or 210) and keeps the straps securely in place until the inflatable unit load device 102 is deflated. This allows for quick positioning of the cargo retaining system, such as the various strap systems, prior to inflation of the inflatable unit load device 102 and when it is easier to manipulate the deflated inflatable unit load device 102 as compared to a rigid unit load device.

FIG. 2B is a front-side view of the inflatable unit load device 102. As shown in FIG. 2B, the inflatable unit load device 102 may have substantially flat top and bottom surfaces and may have a height based on the dimensions of the inflatable bladder 240. In one implementation, the height of the inflatable unit load device 102 may be around 12 inches, although other dimensions are also contemplated. The outer material may include sidewall panels 230, such as 230a and 230b, around the sides of the inflatable unit load device 102, and a top surface and bottom surface that may include top and bottom sleeve panels 222, such as 222a and 22b. The sidewall panels 230 and top and bottom sleeve panels 222 may form the rectangular structure of the inflatable unit load device 102. It should be understood that while a rectangular shape is depicted in FIGS. 2A-2D, other shapes and configurations are also contemplated based on the cargo and/or parameters for the inflatable unit load device 102. It should further be understood that in some implementations, one or more of the interior bladder cells 240 depicted in FIG. 2C may also be inflated to various pressures in various configurations in order to change the overall structure and/or shape of the inflatable unit load device 102.

In some implementations, pass-through rigging slots 234 may be formed within the inflatable unit load device 102. The pass-through rigging slots 234 may be a channel or sleeve that passes through the inflatable unit load device 102 and provides a place for webbing straps to be threaded through the pass-through rigging slots 234. This keeps the webbing straps from being exposed during loading, transportation, or deployment of the inflatable unit load device 102 as the webbing straps are located within the interior of the inflatable unit load device 102 rather running along the bottom of the inflatable unit load device 102.

In some implementations, slat pockets may be included within the outer material, or in pass-through slots on the inflatable unit load device 102 that reinforcement slats may be situated within. In some implementations, the slat pockets may receive the friction board or other protective material. In further implementations, the slat pockets may retain and position reinforcement slats, such as plywood or aluminum slats that provide additional protection to the inflatable unit load device 102. The reinforcement slats can spread out the weight of the load across the entire portion of the material and provide additional protection and strength where the reinforcement slats are located.

Figure 2D:
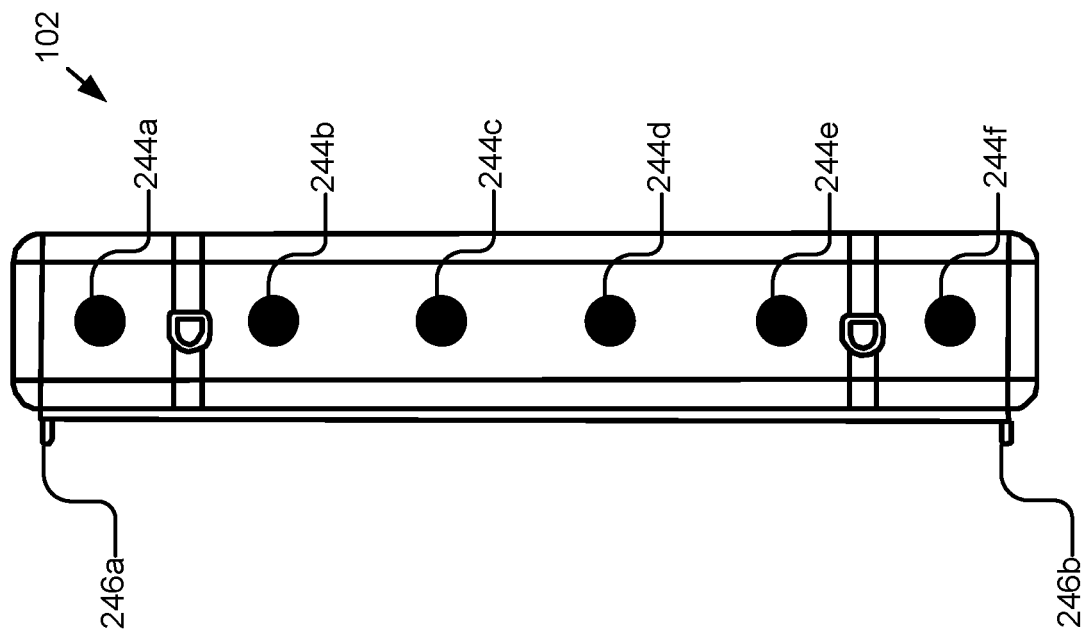
FIG. 2D is a right-side view of an example inflatable unit load device.
Figure 2C:
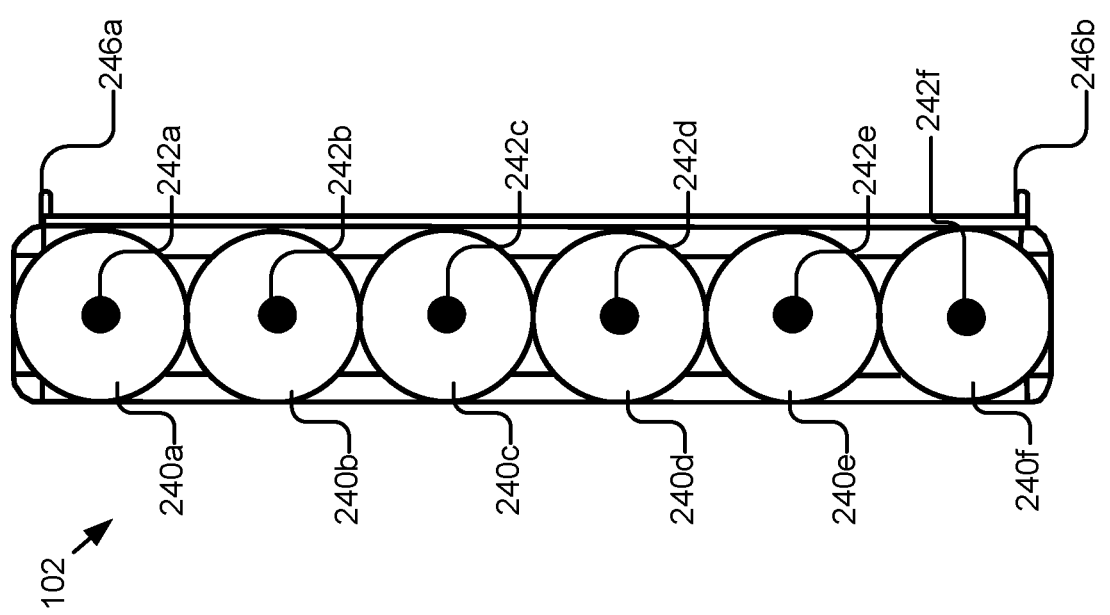
FIG. 2C is a left-side view of an example inflatable unit load device.

FIG. 2C shows an interior exposed view of a left-side view of the inflatable unit load device 102. As shown in FIG. 2C, the inflatable unit load device 102 may include a bladder 240 disposed between the top surface and the bottom surface. The bladder 240 may include one or more interior bladders cells 240a-240n, such as 240a, 240b, 240c, 240d, 240e, and/or 240f. The bladder 240 may be form factored to be a specific shape when inflated and may be formed out of a durable and inflatable material. It should be understood that while the interior bladder cells 240a-240n are depicted as being cylindrical in shape in FIG. 2C, other shapes and configurations are also contemplated for the interior bladder cells 240. The interior bladder cells 240a-240n may be positioned and retained within the inflatable unit load device 102 using the outer material. In some implementations, the outer material may have securing mechanisms in place to retain the one or more interior bladder cells 240 in place within the outer material, even when deflated. In some configurations, the shape and configuration of the bladder 240 keeps the inflatable unit load device 102 from folding, tacoing, or canoeing during an airdrop deployment.

In some implementations, the interior bladder cells 240 may include one or more pressure relief valves 242, such as 242a, 242b, 242c, 242d, 242e, and/or 242f. It should be understood that while the pressure relief valves in FIG. 2C are depicted as being located on the ends of the interior bladder cells 240, the pressure relief valves can be located anywhere on the interior bladder cells 240 as appropriate and may be used to assist in dissipating impact force as needed, such as during landing from a parachute deployment. The pressure relief valves 240 may be configured to release excess pressure as needed when the interior pressure within each of the interior bladder cells 240a-240n exceeds specific pressures. The pressure relief valves 240 may be set or switched out for different pressure relief valves that configured to release when the interior pressure exceeds specific thresholds. This allows the inflatable unit load device 102 to have specific pressure relief thresholds where the pressure relief valves release based on mission parameters. For example, heavier cargo 110 loads may require higher pressure releases of pressure relief valves to accommodate the increased impact force from the heavier cargo 110 load on landing.

In some implementations, the cargo retaining system may include extended D-ring 246, such as 246a or 246b, that may extend out from the top surface of the inflatable unit load device 102 and assist in easier securing of the cargo 110. In further implementations, the extended D-ring 246 may be another type of attachment mechanism that is suitable for securing the cargo 110 to the inflatable unit load device 102.

FIG. 2D depicts a right-side view of the inflatable unit load device 102. As shown in FIG. 2D, one or more of the interior bladder cells 240a-240n may include a mechanical flange 244, such as 244a, 244b, 244c, 244d, 244e, or 244f, that allows the one or more interior bladder cells 240a-240n to be inflated or deflated as needed. The mechanical flange 244 may be a suitable connection point that an inflation device, such as an air compressor, may be attached to inflate the interior bladder cells 240. In some implementations, the mechanical flange 244 may be a common connection type that allows the inflatable unit load device 102 to be used in field by a common air compressor with the correct attachment mechanism. In some implementations, the mechanical flange 244 may include one or more back-up or additional inflation mechanisms that increase the dependability of the inflatable unit load device 102. In some implementations, the mechanical flange 244 may be protrude through the outer material for ease of accessibility. In further implementations, the mechanical flange 244 may be protected by the outer material or additional flaps of protective material to keep the mechanical flange 244 from being damaged during storage, loading, transport, or deployment of the inflatable unit load device 102.

FIGS. 3A and 3B show an example impact pillow 302 for use with the inflatable unit load device 102. FIG. 3A shows a top view of the impact pillow 302. The impact pillow 302 may be an additional protective inflation system that is configured to protect the cargo 110 of the inflatable unit load device 102. The impact pillow 302 may include one or more interior bladder cells and pressure release valves that are set to release when the impact pillow 302 is compressed and the interior pressure of the impact pillow 302 increases. In some implementations, the impact pillow 302 may be a general shape, while in other implementations it may be specially designed for certain cargo 110. In some implementations, the impact pillow 302 may be positioned on the cargo 110 to protect the load, such as from the impact force on landing during a parachute deployment. For example, the impact pillow 302 may be positioned between the cargo 110 and the top surface of the inflatable unit load device 102, such that when the bottom surface of the inflatable unit load device 102 comes into contact with the ground on impact, the impact force is spread out over time and dissipates as the pressure valves of the impact pillow and/or the inflatable unit load device 102 are released. This spreading out of the impact force reduces the chance of the impact force damaging the cargo 110.

In one specific example, as shown in FIG. 3A, the impact pillow 302 may be shaped to fit underneath a vehicle as the cargo 110. For example, the impact pillow 302 in this example may be shaped like the footprint of the skid plate on the vehicle and may rest underneath the vehicle when the vehicle is secured to the inflatable unit load device 102. As shown in FIG. 3B depicting the side-view of the impact pillow 302, the impact pillow 302 may fit between the wheels and rest against the underside of the vehicle. When the inflatable unit load device 102 makes impact, such as with the ground, the impact pillow 302 absorbs and dissipates the impact force over time to protect the vehicle.

In some implementations, the inflatable unit load device 102 and the impact pillow 302 may rely on cascading deployment of the pressure valves to further protect the cargo 110. The pressure valves of the impact pillow 302 may be set to a different value than the one or more pressure relief valves 242 of the inflatable unit load device 102. This allows the impact pillow 302 to release pressure first to protect and/or absorb the impact force over time before the rest of the inflatable unit load device 102 release pressure at a different pressure threshold. For example, on impact, the impact pillow 302 may compress first as the impact shock transfers through the inflatable unit load device 102 and the impact pillow may begin to deflate as the impact pillow pressure relief value releases pressure in order to spread out the impact over time as it passes on to the cargo 110. Then after the impact pillow 302 releases pressure, the inflatable unit load device 102 may release pressure at a different pressure threshold to further spread out the impact force over time and protect the cargo 110. It should be understood that various pressure reliefs timings can be achieved using the cascading deployment of the pressure and different components of the inflatable unit load device 102 can release pressure at different pressure thresholds as needed.

In some implementations, additional impact pillows 302 may be used to further protect the cargo 110 as needed. In some implementations, the impact pillows 302 can be positioned at various points to absorb specific impact forces. In some implementations, the impact pillows 302 can be used in place of crunch board which is currently used in specific crumble zones to absorb impact. However, crunch board can only be used a single time and can be costly to install and use to protect cargo. The reusable inflatable impact pillows 302 can be used reused over multiple missions to protect cargo 110 and dissipate impact forces. The impact pillows 302 can be designed to various sizes and shapes to replace the crunch board and can be set to specific pressure relief thresholds to further protect the cargo 110.

Figure 4:
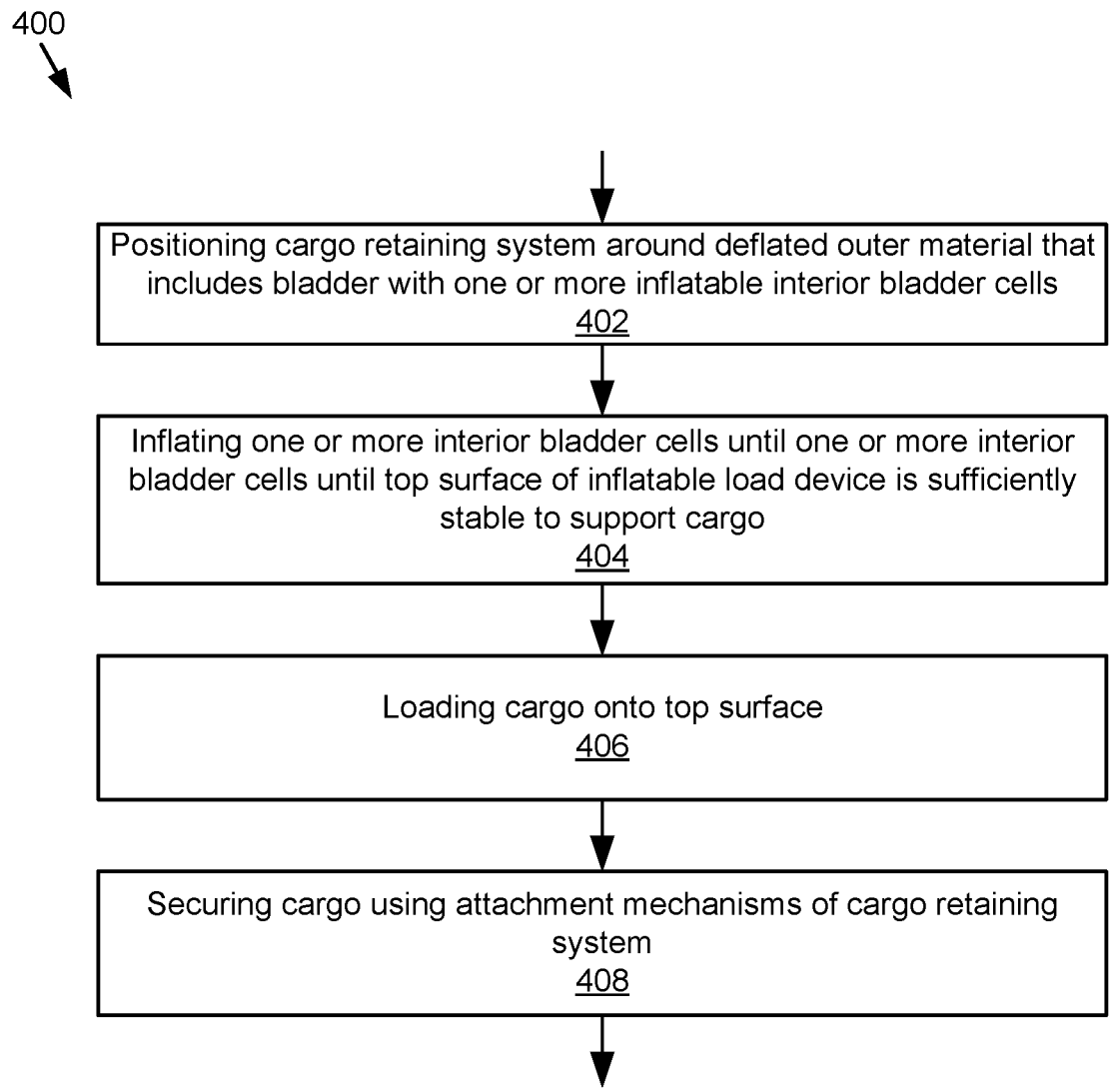
FIG. 4 is a flowchart for a method of loading cargo using an inflatable unit load device.

FIG. 4 is a flowchart 400 of an example method of loading an inflatable unit load device 102. At 402, a cargo retaining system that includes webbing straps, such as 104, 208, or 210 or center strap 204 may be positioned around a deflated bladder 240 of the inflatable unit load device 102 that includes an outer material and one or more inflatable interior bladder cells 240. The cargo retaining system may be laid out and positioned on the ground and then the outer material may be rolled out within the laid-out webbing system. At 404, the one or more interior bladder cells 240 may be inflated up to a desired internal pressure, such as by using an air compressor or other inflation device as described herein, until the top surface of the inflatable unit load device 102 is sufficiently stable to support a cargo 110. In some implementations, the desired internal pressure of the one or more interior bladder cells 240 causes a top surface to form as shown in FIG. 2A. The top surface may be substantially rigid and allow for cargo to be loaded on top of the top surface. In some implementations, as the one or more interior bladder cells inflate, the laid-out cargo retaining system become taut against the outer material which causes the cargo retaining system to stay securely in place around the inflated inflatable unit load device 102. At 406, the cargo 110 may be loaded onto the top surface and at 408 the cargo may be secured by connecting various strapping system to the cargo retaining system using attachment mechanisms.

Figure 5:
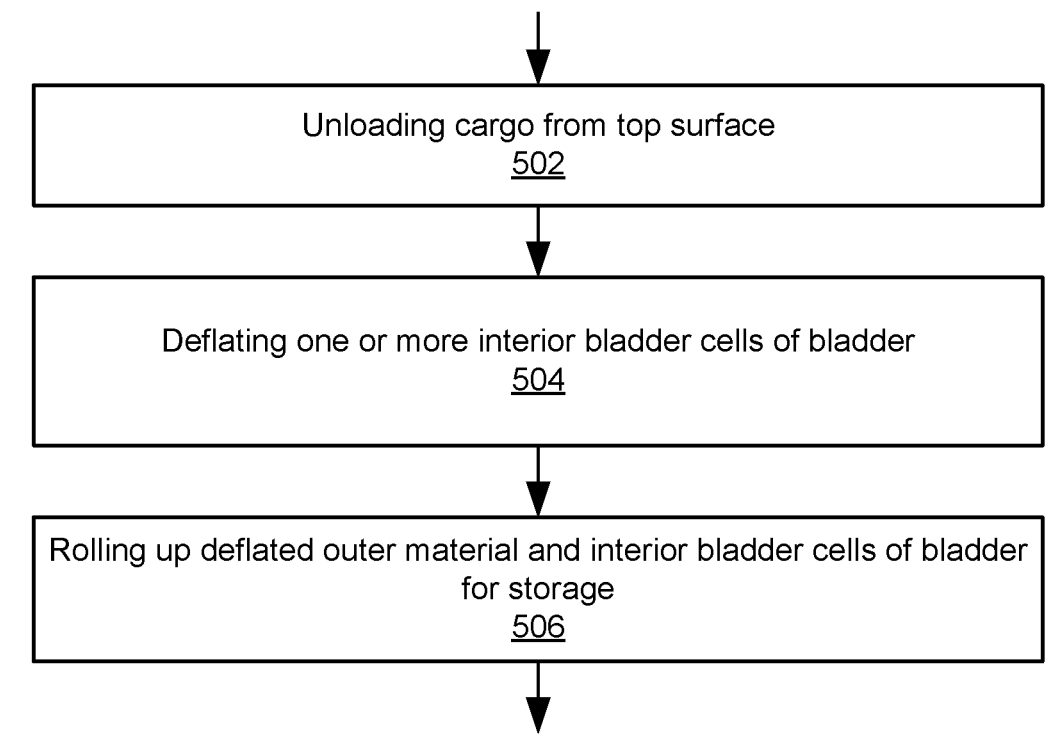
FIG. 5 is a flowchart for a method of deploying cargo using an inflatable unit load device.

FIG. 5 is a flowchart 500 of an example method of deploying an inflatable unit load device 102. At 502, once the inflatable unit load device 102 and cargo 110 have arrived at their destination, such as by unloading from a cargo plane or landing via a parachute deployment. In some implementations, the cargo 110 may be unloaded from the top surface, for example, a vehicle may be driven off the top surface or otherwise moved off the top surface. At 504, the one or more interior bladder cells 240a . . . 240n of the bladder 240 may be deflated, such as by allowing the pressured gas and/or liquid to release from the one or more interior bladder cells 240a . . . 240n. The one or more interior bladder cells 240a . . . 240n may be deflated using a pump or a valve that can be opened to release the internal pressurized material. At 506, the outer material and the one or more interior bladder cells 240a . . . 240n of the bladder 240 may be rolled-up or folded to compact the inflatable unit load device 102 for storage.

In some implementations, once the inflatable unit load device 102 has been deployed and is deflated, it can be used for various additional uses. For example, the inflatable unit load device 102 could be used as a flotation device by reinflating one or more of the inflatable interior bladder cells 240 and used for river or other water crossings to help float things across. In some implementations, a common fitting for the mechanical flange 244 of the inflatable unit load device 102 may be included with various deployed units and air compressors to reinflate the one or more inflatable interior bladder cells 240. In further implementations, the impact pillow 302 may also be used as an additional flotation device. In some implementations, the deflated inflatable unit load device 102 may be used for patient recovery operations, such as a sling that can be attached to a load sling, lift bag, etc. In some implementations, the deflated or inflated inflatable unit load device 102 could be used a shelter or tarp. In some implementations, the inflatable unit load device 102 may be colored in specific patterns based on mission parameters, such as a camouflage pattern or bright orange, etc. In some implementations, the inflatable unit load device 102 could be reinflated and used as a cold weather sleeping mat for users while in the field.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form to avoid obscuring the description.

To ease description, some elements of the system and/or the methods are referred to using the labels first, second, third, or a, b, c, etc. These labels are intended to help to distinguish the elements but do not necessarily imply any particular order or ranking unless indicated otherwise.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

What is claimed is:

1. An inflatable unit load device comprising:
a bladder having one or more inflatable interior bladder cells and a top surface, the top surface of the bladder forming a rigid support surface when the bladder is inflated and the one or more inflatable interior bladder cells including one or more pressure relief valves;
an outer material that positions the one or more inflatable interior bladder cells; and a cargo retaining system configured to retain a cargo on the top surface.

2. The inflatable unit load device of claim 1, wherein the one or more inflatable interior bladder cells are patchable when a leak occurs.

3. The inflatable unit load device of claim 1, wherein the cargo retaining system is configured to attach to a parachute and be deployed from an aircraft.

4. The inflatable unit load device of claim 3, wherein the bladder has a bottom surface opposing the top surface and wherein the one or more inflatable interior bladder cells are disposed between the top surface and the bottom surface, such that the bladder protects the cargo from an impact force to the bottom surface during deployment from an aircraft.

5. The inflatable unit load device of claim 1, wherein the one or more pressure relief valves are positioned on an end of the one or more inflatable interior bladder cells.

6. The inflatable unit load device of claim 5, wherein the one or more pressure relief valves are configured to release an internal pressure within the one or more pressure relief valves when the internal pressure exceeds a threshold value.

7. The inflatable unit load device of claim 1, wherein the one or more inflatable interior bladder cells include a mechanical flange for one or more of inflation of the one or more inflatable interior bladder cells and deflation of the one or more inflatable interior bladder cells.

8. The inflatable unit load device of claim 1, wherein the one or more inflatable interior bladder cells and the outer material are configured to be rolled up for storage when deflated.

9. The inflatable unit load device of claim 1, wherein the cargo is a vehicle positioned on the top surface when the bladder is inflated and securely retained in place by the cargo retaining system.

10. The inflatable unit load device of claim 1, wherein the cargo retaining system includes a webbing system having a center strap that wraps circumferentially around the outer material, the center strap including one or more loops through which parachuting webbing straps may be passed, the one or more loops retaining the parachute webbing in place when the one or more inflatable interior bladder cells are inflated.

11. A method of deploying an inflatable unit load device comprising:
positioning a cargo retaining system around a deflated outer material of an inflatable unit load device that includes a bladder with one or more inflatable interior bladder cells, the one or more inflatable interior bladder cells including one or more pressure relief valves;
inflating the one or more interior bladder cells of the bladder of the inflatable unit load device until a top surface of the inflatable unit load device is sufficiently stable to support a cargo;
loading the cargo onto the top surface that is sufficiently stable to support the cargo; and
securing the cargo using attachment mechanisms of the cargo retaining system.

12. The method of deploying the inflatable unit load device of claim 11, wherein the cargo retaining system includes parachute attachment mechanisms and the method further comprises
attaching a parachute system to the parachute attachment mechanisms; and
deploying the cargo with the inflatable unit load device out of an aircraft via the parachute system.

13. The method of deploying the inflatable unit load device of claim 12, wherein the bladder has a bottom surface opposing the top surface and the one or more interior bladder cells are disposed between the top surface and the bottom surface such that an impact force applied to the bottom surface is dissipated by the one or more inflatable interior bladder cells to protect the cargo from the impact force.

14. The method of deploying the inflatable unit load device of claim 13, wherein after landing, the method further comprises:
unloading the cargo from the top surface;
deflating the one or more interior bladder cells of the bladder; and
rolling up the deflated outer material and the one or more interior bladder cells of the bladder for storage.

15. The method of deploying the inflatable unit load device of claim 13, wherein cargo is further protected from the impact force by an impact pillow that is positioned between the cargo and the top surface.

16. An inflatable unit load device system comprising:
a bladder having one or more inflatable interior bladder cells disposed between a top surface and a bottom surface, the top surface of the bladder forming a rigid support surface on which cargo can be loaded when the bladder is inflated;
a cargo retaining system that retains the cargo on the top surface; and
an impact pillow with a separate inflatable bladder system, the impact pillow being positioned between the top surface and at least a portion of the cargo to provide additional protection to the cargo.

17. The inflatable unit load device system of claim 16, wherein the impact pillow is specifically shaped to provide protection to at least a portion of the cargo when an impact force is applied to the bottom surface.

18. The inflatable unit load device system of claim 16, wherein the impact pillow includes one or more impact pillow pressure relief valves that are configured to release pressure at a first threshold pressure value and wherein the one or more inflatable interior bladder cells include one or more pressure relief valves that are configured to release pressure at a second threshold pressure value.

19. The inflatable unit load device system of claim 18, wherein the first threshold pressure value and the second threshold pressure value providing cascading pressure relief to protect at least a portion of the cargo from an impact force applied to the bottom surface during landing.

20. The inflatable unit load device system of claim 16, wherein the cargo retaining system is further configured to attach to a parachute system and the cargo is deployable from an aircraft via the parachute system.

* * * * *